March 3, 1931. J. A. ROUNDS 1,794,734
LUBRICATING FRICTION PLATE FOR DRIVING BOXES
Filed July 2, 1929
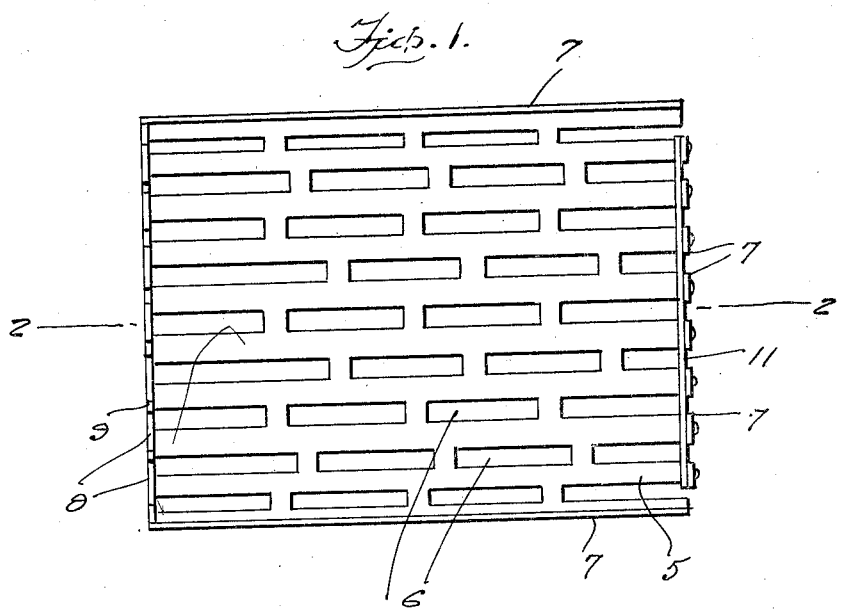
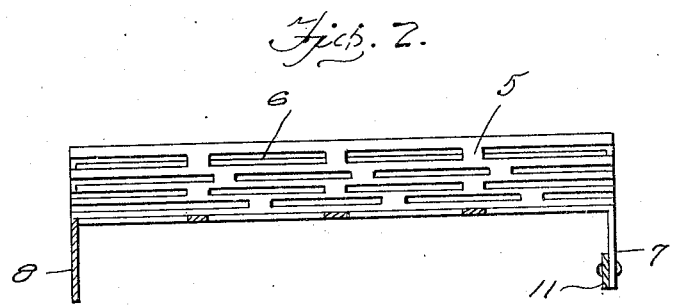
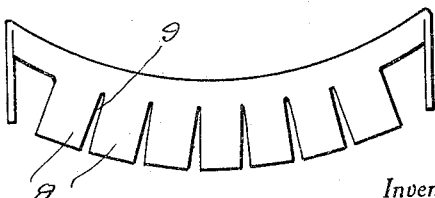
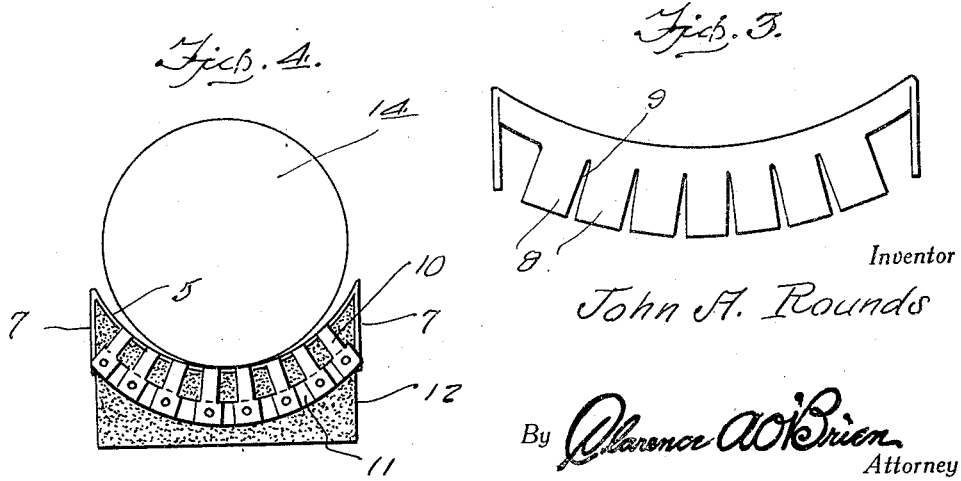
Inventor
John A. Rounds
By Clarence A. O'Brien
Attorney Patented Mar. 3, 1931

1,794,734

UNITED STATES PATENT OFFICE

JOHN A. ROUNDS, OF FORT SCOTT, KANSAS

LUBRICATING FRICTION PLATE FOR DRIVING BOXES

Application filed July 2, 1929. Serial No. 375,353.

The present invention relates to a friction plate for use in a locomotive driving box grease cellar and has for its prime object to provide a plate which is used on top of a cake of grease to keep it from feeding too fast and is used under the journal in a grease cellar of a driving box.

Another very important object of the invention resides in the provision of a device of this nature which is exceedingly simple in its construction, yet thoroughly efficient and reliable in use.

With the above and numerous other objects in view as will appear as the description proceeds, the invention resides in certain novel details of construction, and in the combination and arrangement of parts as will be hereinafter more fully described and claimed.

In the drawing:

Figure 1 is a bottom plan view of the plate embodying the features of my invention, Figure 2 is a sectional view therethrough taken substantially on the line 2—2 of Figure 1, Figure 3 is an end elevation thereof, and Figure 4 is another end elevation thereof taken opposite to that shown in Figure 3 and showing the plate on a cake of grease and under a journal.

Referring to the drawing in detail it will be seen that the numeral 5 denotes a rectangular plate which is curved transversely and formed with a plurality of longitudinally extending slots 6. Side skirts 7 depend from the side edges of the plate 5.

An end skirt 8 extends from one end of the plate 5 and is slitted as is indicated at 9 at regular spaced intervals.

From the other end of the plate 5 there extends a plurality of strips 10 which are riveted to an arcuate elongated strip 11.

From the above detail description of this device it will be seen that it may be placed over a cake of grease 12 to be disposed under the journal 14 so that as the journal rotates a limited amount of grease will come into contact with the journal and properly lubricate the journal without waste of grease.

It is thought that the construction, utility and advantages of the invention will be quite apparent without a more detailed description thereof.

It is apparent that changes in the details of construction may be resorted to without departing from the spirit or scope of the invention as hereinafter claimed or sacrificing any of its advantages.

Having thus described my invention, what I claim as new is:

A device of the class described comprising an oblong plate curved transversely and perforated and having side skirt members depending from the side edges thereof, an end skirt member at one end of the plate provided with slits, a plurality of depending strips at the opposite end of the plate and an arcuate strip to which the terminals of the plurality of strips are secured.

In testimony whereof I affix my signature.

JOHN A. ROUNDS.